(12) United States Patent
Hsieh et al.

(10) Patent No.: US 10,078,692 B2
(45) Date of Patent: Sep. 18, 2018

(54) METHOD AND SYSTEM FOR PROVIDING A SOCIAL SERVICE BASED ON MUSIC INFORMATION

(71) Applicant: 1MORE INC., Guangdong (CN)

(72) Inventors: Kuanhong Hsieh, Guangdong (CN); Boqing Lin, Guangdong (CN); Yang Yuan, Guangdong (CN); Shixuan Yu, Guangdong (CN)

(73) Assignee: 1MORE INC., Guangdong (CN)

( * ) Notice: Subject to any disclaimer, the term of this patent is extended or adjusted under 35 U.S.C. 154(b) by 406 days.

(21) Appl. No.: 14/781,535

(22) PCT Filed: Jan. 7, 2015

(86) PCT No.: PCT/CN2015/070304
§ 371 (c)(1),
(2) Date: Sep. 30, 2015

(87) PCT Pub. No.: WO2016/109957
PCT Pub. Date: Jul. 14, 2016

(65) Prior Publication Data
US 2016/0364480 A1    Dec. 15, 2016

(51) Int. Cl.
*G06F 17/30* (2006.01)
*G06Q 50/00* (2012.01)

(52) U.S. Cl.
CPC .. *G06F 17/30752* (2013.01); *G06F 17/30867* (2013.01); *G06Q 50/01* (2013.01)

(58) Field of Classification Search
CPC ........ G06F 17/30752; G06F 17/30867; G06Q 50/01
USPC ......................................................... 707/770
See application file for complete search history.

(56) References Cited

U.S. PATENT DOCUMENTS

| | | | | |
|---|---|---|---|---|
| 2008/0091771 A1* | 4/2008 | Allen | ...................... | G06Q 10/06 709/203 |
| 2008/0306826 A1* | 12/2008 | Kramer | .................. | G06Q 30/02 705/14.14 |
| 2011/0093340 A1* | 4/2011 | Kramer | .................. | G06Q 30/02 705/14.58 |
| 2013/0254314 A1* | 9/2013 | Chow | ............... | G06F 17/30899 709/206 |

* cited by examiner

*Primary Examiner* — Shahid Alam
(74) *Attorney, Agent, or Firm* — Polsinelli PC (57) ABSTRACT

A method and a system for providing a social service based on music information is provided. The method includes: obtaining at least one matching rule of pre-stored matching rules, and generating a match instruction, wherein the matching rules are established according to the music information; sending a match request for searching a social interaction terminal; receiving a reply message returned from the server according to the match request; obtaining the identification information corresponding to the linking object according to the identification list, and sending a link request for social interaction to the linking object.

6 Claims, 8 Drawing Sheets

METHOD AND SYSTEM FOR PROVIDING A SOCIAL SERVICE BASED ON MUSIC INFORMATION

CROSS REFERENCE TO RELATED APPLICATIONS

This application is a national stage application (under 35 U.S.C. § 371) of PCT/CN2015/070304, filed Jan. 7, 2015, the contents of which are hereby incorporated by reference in its entirety.

FIELD OF THE INVENTION

The present disclosure relates to technologies of providing a social service based on the Internet, and more particularly relates to a method and a system for providing a social service based on music information.

BACKGROUND OF THE INVENTION

Due to the rapid development of wireless networks, there are more and more scenes of various mobile terminals, including smart phones, IPAD, etc. accessing to the Internet; and more and more merchants, such as coffee shops and shopping malls, have gradually provided wireless WiFi accesses to customs within their scopes, such that users of the mobile terminals can enjoy surfing the wireless network at anytime and anywhere.

People generally and naturally enjoy songs, especially latest released songs via the wireless network when they are walking in the streets. Many mainstream music applications have been established at present, such as QQ music and Kugou music, etc., which provides the users many choices by the way of music databases, music radio, MV, etc. In addition, the music is divided according to music styles. However, such music applications can only provide music enjoyment to the users, rather than providing further interactive communication between one user and another user using another terminal.

Therefore, there is room for improvement within the art.

SUMMARY OF THE INVENTION

Accordingly, it is necessary to provide a method and a system for providing a social service based on music information to solve the problem of the failure for providing various social services on a music application platform.

A method for providing a social service based on music information, which is applied to a terminal, includes:

obtaining at least one matching rule of pre-stored matching rules, and generating a match instruction, wherein the matching rules are established according to the music information;

sending a match request for searching a linking object, wherein the match request includes a first query request for querying the music information stored in a server by other terminals;

receiving a reply message returned from the server according to the match request, wherein the reply message includes a matched terminal list generated by acquiring the music information stored in the server by the other terminals and identification information corresponding to the other terminals;

matching the present terminal with the music information stored in the server by the other terminals in the matched terminal list according to the match request containing the matching rule, and selecting at least one other terminal as the linking object; and sending a link request for social interaction to the linking object according to identification information corresponding to the linking object.

A method for providing a social service based on music information, which is applied to a server, includes:

receiving a match request, wherein the match request includes a first query request for querying the music information stored in a server by other terminals;

acquiring the music information stored in the server by the other terminals and identification information corresponding to the other terminals according to the match request, and generating a matched terminal list; and adding the matched terminal list to a reply message, and sending the reply message to the terminal.

A method for providing a social service based on music information, which is applied to a terminal, includes:

obtaining at least one matching rule of pre-stored matching rules, and generating a match instruction, wherein the matching rules are established according to the music information;

sending a match request for searching a linking object, wherein the match request includes a second query request for obtaining the linking object and the match instruction containing the matching rule, the linking object is at least one other terminal selected by a server by matching the present terminal with the music information stored in the server by other terminals according to the matching rule contained in the match instruction;

receiving a reply message returned from the server according to the match request, wherein the reply message includes: an identification list containing identification information corresponding to the other terminal, the other terminal in the identification list is at least one other terminal selected by the server according to the matching rule contained in the match instruction; and obtaining the identification information corresponding to the linking object according to the identification list, and sending a link request for social interaction to the linking object.

A method for providing a social service based on music information, which is applied to a server, includes:

receiving a match request, wherein the match request includes a second query request for obtaining a linking object and a matching rule;

matching the terminal with the music information corresponding to other terminals according to the matching rule, and selecting at least one other terminal;

acquiring the selected other terminal and identification information corresponding to the other terminal, and generating an identification list containing the identification information corresponding to the other terminal; and adding the identification list to a reply message, and sending the reply message to the terminal.

A system for providing a social service based on music information, which is applied to a terminal, includes:

a first match selecting module configured to obtain at least one matching rule of pre-stored matching rules, and generate a match instruction, wherein the matching rules are established according to the music information;

a first sending module configured to send a match request for searching a linking object, wherein the match request includes a first query request for querying the music information stored in a server by other terminals;

a first receiving module configured to receive a reply message returned from the server according to the match request, wherein the reply message includes: a matched terminal list generated after acquiring the music information stored in the server by the other terminals and identification information corresponding to the other terminals according to the match request;

a first information acquiring module configured to match the present terminal with the music information stored in the server by the other terminals in the matched terminal list according to the match request containing the matching rule, and selecting at least one other terminal as the linking object; and a first link request sending module configured to send a link request for social interaction to the linking object according to the identification information corresponding to the linking object.

A system for providing a social service based on music information, which is applied to a terminal, includes:

a second match selecting module configured to obtain at least one matching rule of pre-stored matching rules, and generate a match instruction, wherein the matching rules are established according to the music information;

a second sending module configured to send a match request for searching a linking object, wherein the match request includes: a second query request for obtaining the linking object and the match instruction containing the matching rule, the linking object is at least one other terminal selected by a server by matching the present terminal with the music information stored in the server by other terminals according to the matching rule contained in the match instruction;

a second receiving module configured to receive a reply message returned from the server according to the match request, wherein the reply message includes: an identification list containing identification information corresponding to the other terminal, the other terminal in the identification list is at least one other terminal selected by the server according to the matching rule contained in the match instruction; and a second link request sending module configured to obtain the identification information corresponding to the linking object according to the identification list, and send a link request for social interaction to the linking object.

By running the method and the system for providing a social service based on music information on the terminals, users communicate with other users having the same music hobby while enjoying the music, such that the terminal users are provided with various social services based on the shared music information. Comparing to traditional social service platforms, the present disclosure is more humanized and more independent choices can be provided.

DETAILED DESCRIPTION OF THE EMBODIMENTS

Based on the third-party application technology of the mobile terminals, a method and a system for providing a social service based on music information is provided. Users can enjoy the music and communicate with other users having the same music hobby at the same time by running the application on the terminals, and the function of providing social service based on shared music information to the terminal users is implemented. Various specific embodiments will be described in detail in company with the drawings.

Figure 1:
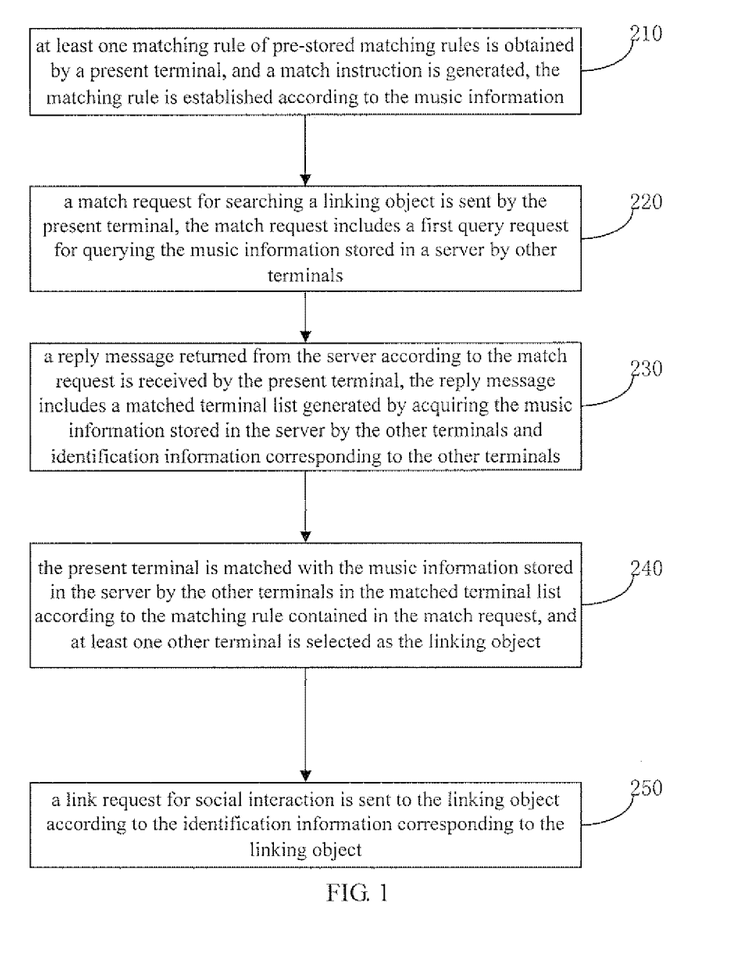
FIG. 1 is a flow chart of a method for providing a social service based on music information in accordance with an embodiment.
Figure 2:
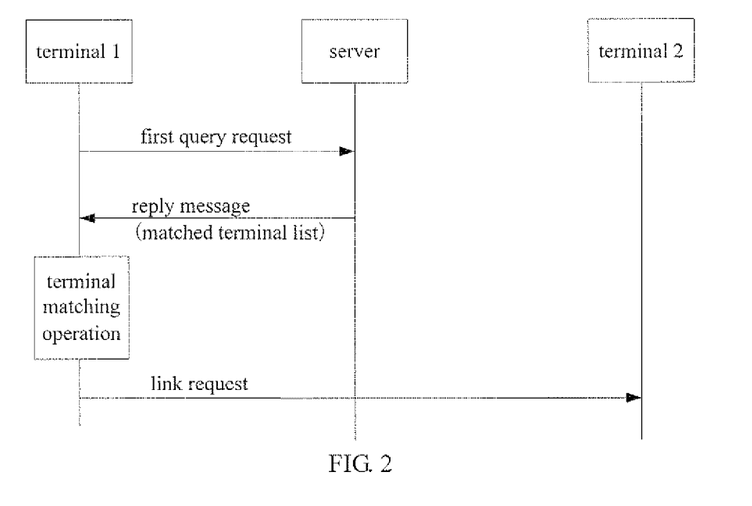
FIG. 2 is a sequence diagram of the method in accordance with an embodiment.

Referring to FIG. 1 and FIG. 2, in an embodiment, a method for providing a social service based on music information is provided. The method includes:

Step 210, at least one matching rule of pre-stored matching rules is obtained by a present terminal, and a match instruction is generated. The matching rule is established according to the music information. In an embodiment, a corresponding prompt box, a button, an instruction input box, or an operation gesture is provided on a display interface of the present terminal to obtain the match instruction generated by at least one matching rule selected by the terminal user.

Step 220, a match request for searching a linking object is sent by the present terminal. The match request includes a first query request for querying the music information stored in a server by other terminals.

Step 230, a reply message returned from the server according to the match request is received by the present terminal. The reply message includes a matched terminal list generated by acquiring the music information stored in the server by the other terminals and identification information corresponding to the other terminals.

Step 240, the present terminal is matched with the music information stored in the server by the other terminals in the matched terminal list according to the matching rule contained in the match request, and at least one other terminal is selected as the linking object.

Step 250, a link request for social interaction is sent to the linking object according to the identification information corresponding to the linking object.

The mentioned music includes: song menu, song with lyric, accompanied song, song menu or song broadcasted on DJ radio, etc. The music information refers to music title, singer or player, composer, lyricist, music attributes (such as rock, jazz, country, classical, etc.), or music playing list, etc., corresponding to the mentioned music. The music information further includes history music information, which is stored music information related to listening period, and the history music information can be stored by list record. A corresponding list or database is provided to store the corresponding history music information corresponding to every terminal. The history music information can be the information acquired by the server, or the information acquired by calling or viewing existing music application.

Referring to FIG. 2, in accordance with the above method, the terminal matching operation is mainly executed on the terminal device, that is a process of matching the present terminal with the music information corresponding to the other terminal, and selecting the corresponding terminal of the other terminals as the linking object, the corresponding terminal meet at least one matching rule contained in the match instruction. At least one terminal 2 can be searched by the terminal 1 in FIG. 2 by sending the match request according to the above method, and the linking request is sent to the terminal 2.

Figure 3:
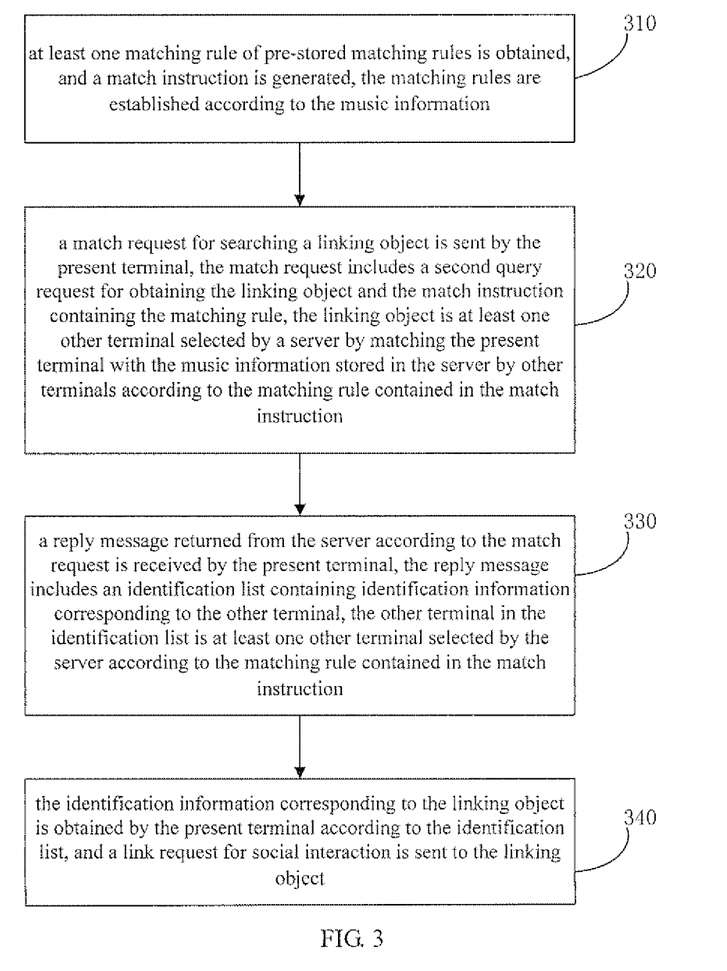
FIG. 3 is a flow chart of the method in accordance with another embodiment.
Figure 4:
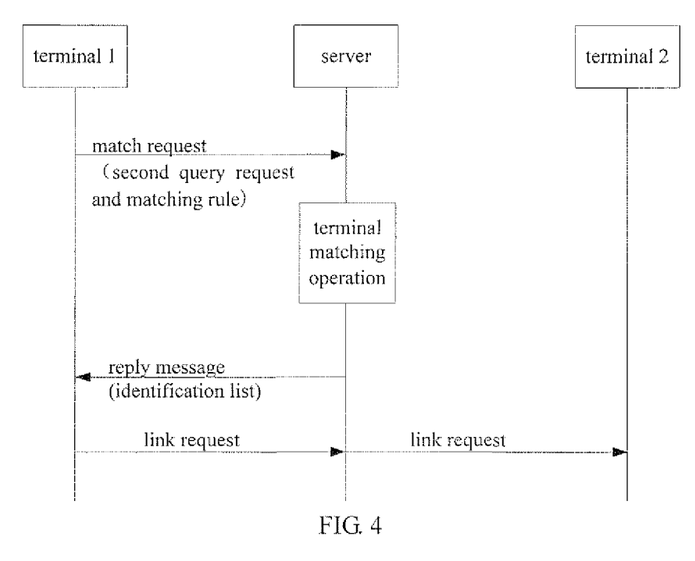
FIG. 4 is a sequence diagram of the method in accordance with another embodiment.

In another embodiment, referring to FIG. 3 and FIG. 4, another method for providing a social service based on music information is provided. The method, which can be applied to a terminal, includes the following steps:

Step 310, at least one matching rule of pre-stored matching rules is obtained, and a match instruction is generated, the matching rules are established according to the music information.

Step 320, a match request for searching a linking object is sent by the present terminal, the match request includes a second query request for obtaining the linking object and the match instruction containing the matching rule (the matching rule may include information and content related to the matching rule). The linking object is at least one other terminal selected by a server by matching the present terminal with the music information stored in the server by other terminals according to the matching rule contained in the match instruction.

Step 330, a reply message returned from the server according to the match request is received by the present terminal. The reply message includes an identification list containing identification information corresponding to the other terminal. The other terminal in the identification list is at least one other terminal selected by the server according to the matching rule contained in the match instruction.

Step 340, the identification information corresponding to the linking object is obtained by the present terminal according to the identification list, and a link request for social interaction is sent to the linking object.

Referring to FIG. 4, in the illustrated embodiment, the terminal match operation related to the linking object is mainly executed on the terminal device. At least one terminal 2 can be searched by the terminal 1 in FIG. 4 by sending the match request according to the above method, and the linking request is sent to the terminal 2.

In short, according to different match requests, different processes may exist in the step 240 and the step 320 according to the above two embodiments. And with regard to sending the link request, the link request can be transmitted by the server matched with the terminal, or it can also be transmitted only by a mobile communication server. Therefore, the identification information corresponding to the linking object is actually partial content acquiring from the identification information corresponding to the other terminal, and the identification information corresponding to the other terminal may concretely be address identification information of the terminal, or non-address identification information. The address identification information is directly used to lock a communication address of the linking object, and a communication link between the two terminals is established. While the non-address identification information includes register information of the terminal, preset identification code, etc., the identification code can be updated and reset every time when the server sends the reply message. For example, the preset identification code can be s sort code provided to the other terminal when acquiring the present terminal and the music information corresponding to the other terminal according to querying the match request, or s sort code provided for the match terminal number in the returned linking object when returning the reply message contained the linking object according to the match request. If the identification information corresponding to the other terminal includes non-address identification information, the step of sending the link request for social interaction to the linking object according to the identification information corresponding to the linking object in the above step 250 and step 340 includes the following two steps:

Firstly, an address query request is sent to the server according to identification information corresponding to the linking object.

Then, the address information returned according to the address query request is received.

Finally, a link request is sent to the linking object according to the address information.

In all of the above embodiments, the music information usually comes from the server in view of a storage capacity of the terminal. In a specific embodiment, providing a music share platform having the same function with the traditional music application (such as QQ music, KuGoo music, etc.) to the terminal users is firstly considered, and information related to the terminal users is saved in the platform server, such as history music information. Naturally, another solution can also be used, for example, after the method for providing a social service based on music information of the illustrated embodiment is executed on the terminal, a pop-up dialog box prompts the user to select whether to allow querying the information (including the music information currently playing and the history music information) of the existing music application (such as QQ music, KuGoo music, etc.) of the terminal or not, then the information of the existing music application (such as QQ music, KuGoo music, etc.) of the terminal is called or viewed according to the permission selection of the users, and the history music information saved in the music application is acquired or backed up to the server. Therefore, the server providing the history music information can be a server side or a cloud space independently built in the disclosure, and can also be a server side or a cloud space provided by the existing music application (such as QQ music, KuGoo music, etc.).

The present disclosure is not limited to the above two embodiments, other solutions can also be used, such as the disclosure content of the following embodiment. If the above second solution is used, before the step 210 and step 310, the method further includes the following steps:

Whether the permission for checking the information of the existing music application of the terminal is obtained or not is determined.

If the permission for checking the information of the existing music application of the terminal is obtained, music information saved in the existing music application platform of the terminal by the present terminal or music list information saved in the player of the present terminal is acquired, and the information acquired is backed up and saved on the server. The server here refers to a server side or a cloud space independently built in the disclosure. Conversely, the page is returned, and a pop-up prompt box is provided to the users to select whether to allow to check the information of the existing music application (such as QQ music, KuGoo music, etc.) of the terminal.

According to the above embodiment, in order to provide the history music information conveniently, in an embodiment, the method for providing a social service based on music information further includes: acquiring the music information that is currently playing on the terminal or the history playing music list, and uploading to the server to update the music information corresponding to the terminal.

According to the embodiment, the existing music application (such as QQ music, KuGoo music, etc.) of the terminal can be called or viewed after acquiring the permission selection of the terminal users, then the music information the terminal is currently playing or the history music list is uploaded to the server side of own configuration, and the history music information corresponding to the terminal is gradually updated. In order to reduce the storage pressure of the server, it may only consider saving and backing up the history music information of the registered users. Consequently, the other terminal information returned according to the match request can also be based on the registered users.

The matching rules mentioned in all of the above embodiments, are mainly established based on the music information. The music information mainly includes the following categories:

In the first category, there are more than three songs with a same music title in two terminals.

In the second category, the two terminals record a same song at recent time; preferably, determine whether the song is the same according to the music title, the recent time here refers to the time corresponding to a last updated record of the music information. Commonly, if the step 100 is executed, the song recorded at the recent time should be the playing music of the present terminal.

In the third category, there is more than 60% similarity of the music information between the two terminals; the music information with more than 60% similarity here is determined based on the music title, singer, player, songster, songwriter or music attributes (such as rock, jazz, country, classical, etc.).

In the fourth category, the currently playing music between the two terminals comes from a same music type database. To determine if the currently playing music between the two comes from a same music type database, it can call or check the information of the existing music application (such as QQ music, KuGoo music, etc.) of the terminal after acquiring the permission selection of the terminal users, and determine if the currently playing music is in the same existing category database of the existing music application (such as QQ music, KuGoo music, etc.), for example, music in the KuGoo music application has been divided into categories of said network madrigal, shop music, touch, new song, square dance music, network hot song, etc., the users can only select music according to the their own hobby, and when performing match of the fourth category, the category database of the existing music application (such as QQ music, KuGoo music, etc.) can be directly used. Either, when performing match of the fourth category, it can be based on the music attribute corresponding to the present music, if the music attribute is the same, it is from a same music type database, conversely, it is not from a same music type database. The music currently playing of the two terminals can be the music corresponding to the recent period in the music information real-time updated, and also can directly be the music currently playing acquired from the terminal.

The above embodiments only provide several limited categories of matching rules established based on music information, other matching rules between terminals based on the history music information of the terminal are also included, which are not exhaustively enumerated here, the matching rules here include various solutions matching two terminals based on the music title, singer, player, listening period, songster, songwriter or music attributes (such as rock, jazz, country, classical, etc.).

According to all of the above embodiments, in an embodiment, a corresponding prompt box, a button, an instruction input box, or an operation gesture is provided to obtain the match instruction generated by at least one matching rule selected by the terminal users. Accordingly, in order to provide more humanized services, a backlog item can be added in the matching rules, that is to say, the backlog item is added in the corresponding prompt box, the button, the instruction input box, or the operation gesture on the terminal display interface, when the backlog item is added, the prompt box, the button, the instruction input box, or the operation gesture in which the backlog item can be input is popped up or brought out. The meaning being brought out is that the prompt box, the button, the instruction input box, or the operation gesture characterized the backlog item is turned into the status of directly inputting information or adding edit, without popping up another prompt box, another button, another instruction input box, or another operation gesture to input the selected instruction.

In all of the above embodiments, no matter to perform the terminal match operation for searching the linking object on the terminal device or on the server side, the following two solutions can both be used to implement the confirmation of the linking object.

The first solution is to orderly or randomly select at least one match request containing the matching rule, match the present terminal with the music information corresponding to the other terminal, and select one other terminal from the other terminals as the linking object, the terminal meets at least one match request containing the matching rule. In a preferred embodiment, only one matched terminal is queried when executing the terminal match operation. The match terminal can be identified as a linking object to obtain corresponding identification information.

The second solution is to match the present terminal with the music information corresponding to the other terminal, select multiple terminals from the other terminals as the linking object, the multiple terminals meet at least one matching rule contained in the match instruction, and obtaining corresponding identification information. When the number of the linking object is more than one, a list for displaying identification information corresponding to all linking objects is provided to the users to select an object the users want to start the link request, and to obtain a link instruction generated by at least one linking object selected, the identification information of the selected linking object is acquired according to the link instruction.

The present disclosure is not only limited to the above two embodiments, the number bringing out the matched terminals in a list can be selected freely. The former one of the above solutions can reply corresponding information to the terminal users more quickly, and the latter one provides more selections to the terminal users for data support.

Consequently, in the method shown in FIG. 1, in an embodiment, the step of corresponding set of the identification information according to the linking object includes the following steps:

If the number of the selected linking object is more than one, a list for displaying identification information corresponding to all linking objects is provided to the terminal users to select an object. The identification information of the linking object selected is acquired according to the link instruction generated by at least one linking object the users select.

In the method shown in FIG. 3, in an embodiment, the above the step of obtaining the identification information corresponding to the linking object according to the identification list includes the following steps:

displaying the above identification list for providing selection to the terminal users, generating a link instruction according to at least one other terminal the users select, and acquiring the identification information of the other terminal selected as the identification information of the linking object.

Figure 5:
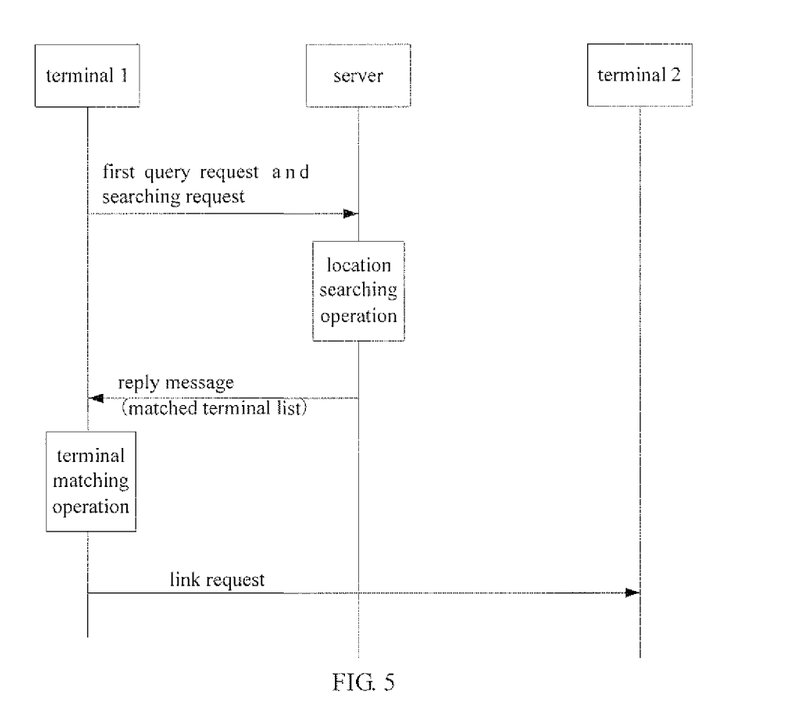
FIG. 5 is a sequence diagram of the method in accordance with another embodiment.
Figure 6:
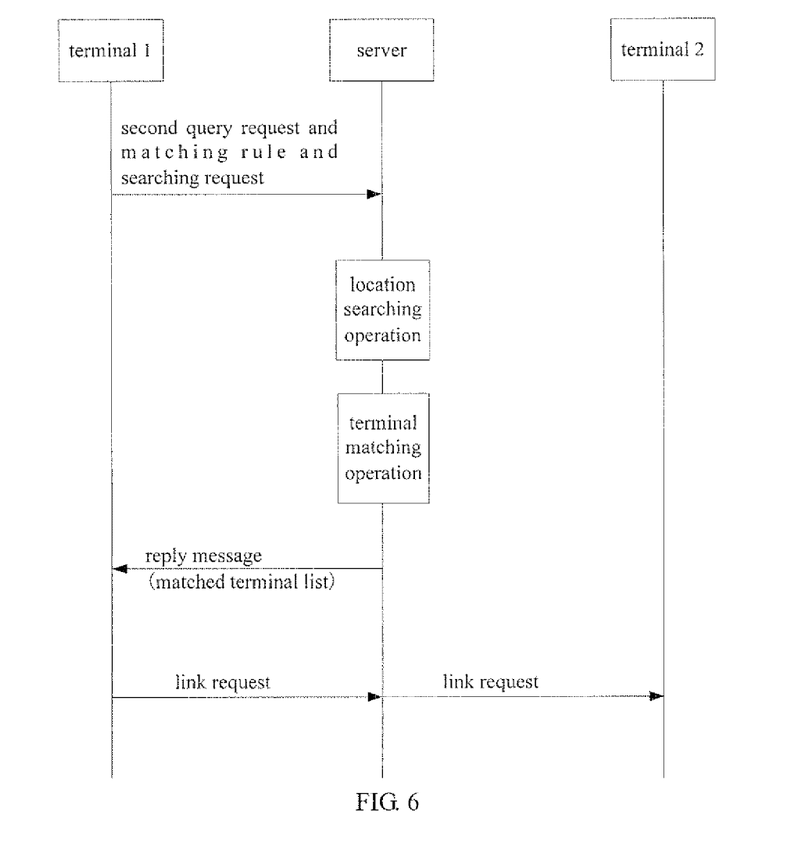
FIG. 6 is a sequence diagram of the method in accordance with an embodiment.

According to the above embodiment, in an embodiment, the match request further includes a searching request for searching the other terminal at the same location area with the present terminal. Referring to FIG. 5 and FIG. 6, the location searching operation executed according to the searching request can be set in the server side. It is mainly for searching the other terminal within the same location area as the present terminal, and limiting the process of executing the terminal match operation in the other terminals selected according to the other terminal searched, so that the computation burden is reduced to improve efficiency of information feedback. Referring to FIG. 5, according to the embodiment of the FIG. 2, the matched terminal list in the reply message returned from the server according to the match request should includes: querying the music information stored in the server by the other terminal at the same location area with the present terminal and the identification information set corresponding to the other terminal according to the match request, for the terminal device to match the present terminal with the music information corresponding to the other terminal, and select at least one other terminal from other terminals at the same location area with the present terminal as a linking object, the selected other terminal meets at least one matching rule contained in the match instruction. Referring to FIG. 6, according to the embodiment of FIG. 4, the server executes location searching operation according to the match request to search the other terminal at the same location area with the present terminal, and select at least one terminal from other terminals at the same location area with the present terminal as a linking object, the selected other terminal meets at least one matching rule contained in the match instruction.

Figure 7:
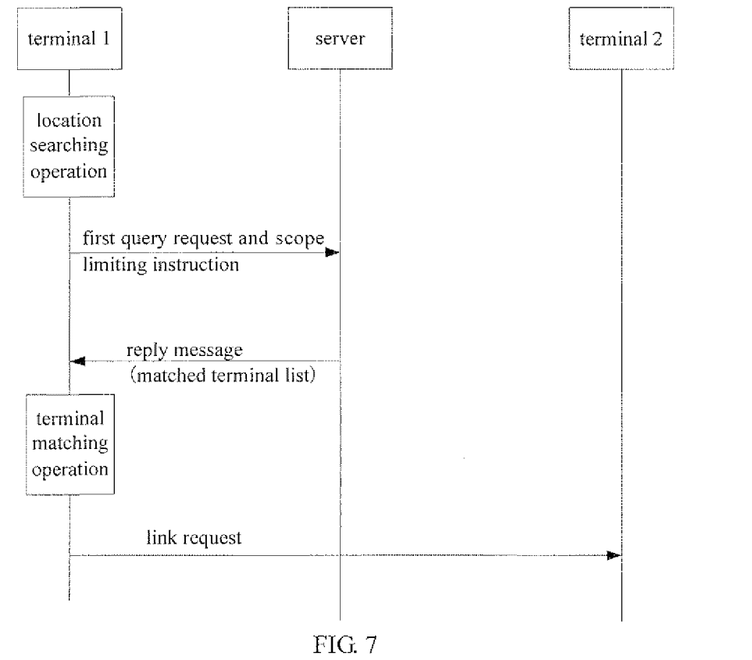
FIG. 7 is a sequence diagram of the method in accordance with an embodiment.
Figure 8:
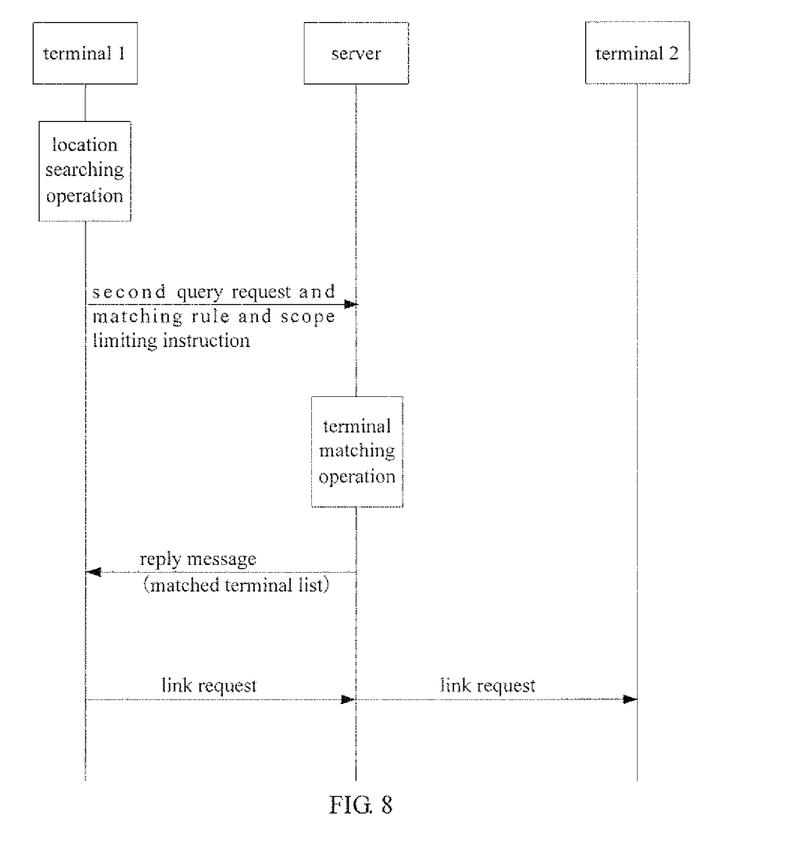
FIG. 8 is a sequence diagram of the method in accordance with an embodiment.

According to the above embodiment, in an embodiment, the location searching operation of searching the other terminal at the same location with the present terminal can be configured to the terminal device side, for example, referring to FIG. 7 and FIG. 8, the embodiment further includes the following steps:

Firstly, the present terminal searches the other terminal at the same location area with the present terminal.

Then, the present terminal determines a scope of the other terminal according to the searching result to generate a scope limit instruction, and adds the scope limit instruction to the match request to limit a query scope of the other terminal. When the terminal device searches the other terminal at the same location area with the present terminal, based on the scope limit instruction in the match request, the reply message returned by the terminal according to the match request may be terminal information contained in the matched terminal list for the other terminal to meet the query scope. Or the identification list contains the other terminal obtained by the server after matching the present terminal with the music information contained in the scope limit instruction corresponding to the other terminal according to the match request.

The same location area mentioned in all of the above embodiments is a preset LAN location scope, or is administered by a same base station; the preset location scope may belong to a same gateway or a same LAN. The matching between the history music information of the other terminal searched by the location searching operation and the present terminal is executed to narrow the execution scope of the terminal match, the scope is narrowed in the terminals at the same location area by the location area limit, the operation speed is reduced and the efficiency is increased. The same location area limited by the preset location scope can be café, community, airport, etc., it can be confirmed by determining whether belongs to a same gateway or a same LAN. When the match terminal can't be searched by the location searching operation, the location searching operation can be skipped, or a prompt box can be popped out for users to query whether skip the location searching operation or restart the location searching operation, before selecting to restart the location searching operation or to execute the location searching operation at the beginning, a selection prompt box of location searching scope can be provided for the terminal device users to select at least one location searching scope, and to execute the location searching operation. Therefore, in the illustrated embodiment, before sending the searching request or searching the other terminal at the same location area with the present terminal, the method further includes:

Firstly, the present terminal provides a prompt box or a list for selecting the location searching scope in the same location area.

Afterwards, the present terminal obtains at least one selected location searching scope to generate a location scope searching instruction, according to the location scope searching instruction, the searching request is sent or the step of searching the other terminal at the same location area with the present terminal is executed, the same location area is limited in at least one selected location searching scope.

According to all of the embodiments, for providing flexible social interaction selection, in an embodiment, various pre-stored social interactions is provided, such as the following several main social interactions:

In the first kind of social interaction, music between the present terminal and the other terminal is shared; corresponding to this kind of social interaction, the link request can includes the following information: the music list information stored in the present terminal, recommended music information, download or play website associated with the music, etc.

In the second kind of social interaction, favorite celebrities and their DJ channel are shared; corresponding to this kind of social interaction, the link request can includes the following information: the music list information stored in the present terminal, recommended music information, download or play website associated with the music, etc.

In the third kind of social interaction, the playing music in the other terminal to the present terminal is synchronized; corresponding to this kind of social interaction, the link request can includes: music data the present terminal is playing, or link website of the music the present terminal is playing (including download or play website), etc.

In the fourth kind of social interaction, information of the other terminal is queried; corresponding to this kind of social interaction, the link request can includes the following instructions: a request command for querying information of the other terminal, the information of the other terminal can specifically be location information of the other terminal, music list information in the terminal, playing music information, or communication information (such as telephone number, email address, WeChat number, QQ number, etc.), or registration number associated with the method and the system, etc.

In the fifth kind of social interaction, a conversation with the other terminal is built. Corresponding to this kind of social interaction, the link request can includes telephone number, email address, WeChat number, QQ number, communication information of registration number associated with the method and the system, etc.

The disclosure is not limited to the above embodiments, but further includes common social interactions in the other field. The link request with corresponding format is preset according to the social interaction.

The disclosure is based on various social interactions, in the step 250, when the link request for social interaction is sent to the linking object according to the identification information corresponding to the linking object; at least two following solutions can be used.

According to the first kind of social interaction, firstly, the present terminal obtains a first interactive instruction or a second interactive instruction generated by at least one selected social interaction in the pre-stored social interactions; in an embodiment, a corresponding prompt box, button, instruction input box, or operation gesture is provided on the terminal display interface to obtain the first interactive instruction or the second interactive instruction generated by at least one selected social interaction. Then, a first link request or a second link request set corresponding to the selected social interaction is generated according to the first interactive instruction or the second interactive instruction for sending to the linking object.

According to the second kind of social interaction, firstly, at least one social interaction is orderly or randomly selected in the pre-stored social interactions by the present terminal, and generated a first interactive instruction or a second interactive instruction; a first link request or a second link request set corresponding to the selected social interaction is generated according to the first interactive instruction or the second interactive instruction for sending to the linking object. Preferably, in the illustrated embodiment, a sequential social interaction is chosen; random social interactions may also be used.

The corresponding content of the link request in above two solutions can be referring to the relative explanation of the above five kinds of social interactions, but the disclosure is not only limited to the above two embodiments, the link request can be set in the common ways or format by the technicians of the field, but different social interactions should have different link request content. In the first kind of social interaction, the terminal device user can independently select the social interactions, and the latter one can improve the efficiency of operation program execution.

According to the embodiment, in an embodiment, the method may further include: adding the identification information corresponding to the linking object in the friends list. Therefore, an independent friends information list is provided to build the social interaction based on the music information, the users conveniently build a friends group with the same hobby.

Based on the interactive social service and the sending process of the link request, the disclosure further provides a method for providing a social service based on music information, including the following steps:

Step 301, a link request sent from the other terminal according to a random embodiment of the method for providing a social service based on music information is received by the present terminal.

Step 302, the link request is analyzed by the present terminal, and the information or instruction contained in the link request is obtained, the information or instruction is corresponding to the social interactions.

Step 303, the information or instruction is displayed or prompted by the present terminal.

Step 304, a reply message is sent to the other terminal by the present terminal according to the information or instruction, the reply message includes: the information or instruction corresponding to the social interactions.

In the illustrated embodiment, both the reply message and the link request between the terminals are based on different content provided by social interactions. The detailed specification of various interactions will be specified as follow. The specification is mainly based on the five social interactions.

In the first kind of interaction, music between the present terminal and the other terminal is shared; corresponding to this kind of social interaction, the link request can includes the following information: the music list information stored in the present terminal, recommended music information, download or play website associated with the music, etc. According to the link request, the information of the link request can be displayed on the display interface of the terminal device in the step of 303, and the prompt box is popped out to enquire whether to permit to interact with the terminal sending the link request, if yes, the reply message is replied to the terminal sending the link request according to the permission instruction of the user, the reply message includes the music list information stored in the present terminal, recommended music information, download or play website associated with the music, etc.

In the second kind of interaction, favorite celebrities and their DJ channel are shared; corresponding to this kind of social interaction, the link request can includes the following information: the music list information stored in the present terminal, recommended music information, download or play website associated with the music, etc. According to the link request, the information of the link request can be displayed on the display interface of the terminal device in the step of 303, and the prompt box is popped out to enquire whether to permit to interact with the terminal sending the link request, if yes, the reply message is replied to the terminal sent the link request according to the permission instruction of the user, the reply message includes the music list information stored in the present terminal, recommended music information, download or play website associated with the music, etc.

In the third kind of interaction, the playing music in the other terminal to the present terminal is synchronized; corresponding to this kind of social interaction, the link request can includes: music data the present terminal is playing, or link website of the music the present terminal is playing (including download or play website), etc. According to the link request, the information of the link request can be displayed on the display interface of the terminal device in the step of 303, and the prompt box is popped out to enquire whether to permit to interact with the terminal sending the link request, if yes, the reply message is replied to the terminal which sent the link request according to the permission instruction of the user, the reply message includes music data the present terminal is playing, or link website of the music the present terminal is playing (including download or play website), etc.

In the fourth kind of interaction, information of the other terminal is queried; corresponding to this kind of social interaction, the link request can includes the following instructions: a request command for querying information of the other terminal, the information of the other terminal can specifically be location information of the other terminal, music list information in the terminal, playing music information, or communication mode information (such as telephone number, email address, WeChat number, QQ number, etc.), or registration number associated with the method and the system, etc. According to the link request, the prompt box can be popped out on the display interface of the terminal device in the step of 303 to enquire whether to permit to interact with the terminal sending the link request, for obtaining the selection instruction the terminal device user determined whether to permit, the reply message is replied to the terminal which sent the link request according to the permission instruction of the user, the reply message includes: location information of the other terminal, music list information in the terminal, playing music information, or communication mode information (such as telephone number, email address, WeChat number, QQ number, etc.).

In the fifth kind of interaction, a conversation with the other terminal is built. Corresponding to this kind of social interaction, the link request can includes telephone number, email address, WeChat number, QQ number, communication information of registration number associated with the method and the system, etc. According to the link request, the communication mode information of the link request can be displayed on the display interface of the terminal device in the step of 303, and the prompt box is popped out to enquire whether to permit to interact with the terminal sending the link request, if yes, the reply message is replied to the terminal which sent the link request according to the permission instruction of the user, the reply message includes the communication mode information of the present terminal corresponding to the communication mode information of the link request. For example, if the link request includes email address or QQ number, the corresponding relay message includes email address or QQ number of the present terminal.

In summary, according to different social interactions, the information or instruction of the link request can all be displayed or pointed out on the terminal device display interface, and the prompt box is popped out to enquire whether to permit to interact with the terminal sending the link request, for obtaining the permission instruction of the terminal device user, the reply message set corresponding to the social interaction identification contained in the link request is sent to the other terminal according to the permission instruction. The social interaction identification is mainly used to distinguish various social interactions, the identification can also added in the link request, so that the terminal receiving the link request can identify the social interaction selected by the terminal sending the link request, and reply the reply message corresponding. Therefore, in an embodiment, the link request includes the social interaction identification set corresponding to the social interactions, in the step of 302, the link request is analyzed, the social interaction identification contained in the link request and the information or instruction set corresponding to the social interaction identification is obtained; in the step of 304, the present terminal sends reply message to the other terminal according to the information or instruction, the reply message includes: the information or instruction set corresponding to the social interaction identification.

According to the illustrated embodiment, in an embodiment, the step of sending the reply message according to the information or the instruction includes: when the link request includes the communication mode information, the communication information is analyzed to obtain the communication mode identification corresponding set, the interface is cut into the communication application interface corresponding to the communication mode identification according to the communication mode identification. The communication mode identification specifically refers to distinguish if it is the identification of the communication information such as telephone number, email address, WeChat number, QQ number, etc. For example, when the link request includes one of the telephone number, email address, WeChat number, or QQ number, the communication mode information is analyzed to obtain the corresponding communication mode identification, the interface is cut into the communication application interface corresponding to the communication mode identification according to the communication mode identification, such as calling interface, email sending application interface, WeChat communication interface or QQ chat interface.

In order to provide more humanized service, in an embodiment, the step of sending the reply message according to the information or the instruction includes:

Firstly, providing a list for displaying all pre-stored social interactions.

Then, obtaining a interaction instruction generated by at least one social interaction selected in the pre-stored social interactions.

Finally, a reply message corresponding to the selected social interaction is generated according to the interaction instruction. The reply message refers to the reply message set on account to the above five kinds of social interactions. The function that the terminal receiving the link request can also independently select the social interaction is provided in the embodiment.

According to all of the above embodiments, in order to avoid providing inaccurate information to the users and improve the operability of the method, gender information the other terminal registered, favorite celebrities and their DJ channel, and playing music information, etc. can be added in the link request; according to the received link request containing the kind of the information, a judgment basis is provided for the present terminal user of the other terminal to judge whether to accept the link request of the social interaction. According to the illustrated embodiment, better social surfing enjoyment is provided to the terminal users, the operability of the method is improved. When the terminal receives the link request containing the kind of the information, access of prompt box, button or instruction input box is popped out for displaying information such as gender information the other terminal registered, favorite celebrities and their DJ channel, and playing music information, etc.

FIG. 1 and FIG. 3 are flow charts of the method in accordance with all embodiments. Understandably, although each step displayed in sequence according to the arrows in the flow chart of FIG. 1 and FIG. 3, these steps is not necessarily to be executed in sequence according to the arrows. Unless there is specific explanation in the disclosure, there is no strict limit to the execution sequence of these steps, they can be executed by the other sequence. Furthermore, at least a part of steps in the FIG. 1 and FIG. 3 can include multiple substeps or multiple stages, these substeps or stages are necessarily to be executed at a same time, they can be executed at different time, and their execution sequence are not necessarily to be executed in sequence, they can be executed in turn with the other steps, substeps of the other steps or at least a part of stages.

Although the invention is illustrated and described herein with reference to specific embodiments, the invention is not intended to be limited to the details shown. Rather, various modifications may be made in the details within the scope and range of equivalents of the claims and without departing from the invention.

According to the operation method of the terminal side shown in FIG. 1 and FIG. 2, a method for providing a social service based on music information is provided in an embodiment, the method is applied on a server side, including:

Step A, a match request of the present terminal is received by a server. The match request includes a first query request for querying the music information stored in the server by other terminals.

Step B, the music information stored in the server by other terminals and identification information corresponding to the other terminals according to the match request is acquired, and a matched terminal list is generated by the server.

Step C, the matched terminal list is added to a reply message; and the reply message is sent to the present terminal by the server.

According to adding the searching request or the scope limiting instruction in the match request shown in FIG. 5 and FIG. 7, in the step B, the other terminals in the matched terminal list belongs to the other terminals meeting the scope limiting instruction or belongs to the other terminals searched according to the searching request.

According to the operation method of the terminal side shown in FIG. 3 and FIG. 4, a method for providing a social service based on music information is provided in an embodiment, the method is applied in a server side, including:

Step a, a match request of the present terminal is received by a server. The match request includes a second query request for querying a linking object and a match rule.

Step b, the present terminal is matched with the music information of the other terminal, and at least one other terminal is selected by the server according to the match rule.

Step c, the other selected terminal and identification information of the other terminal is acquired, and an identification list containing identification information corresponding to the other terminal is generated by the server.

Step d, the identification list is added to the reply message, and the reply message is sent to the present terminal by the server.

Based on the step of adding the searching request or the scope limiting instruction in the match request shown in FIG. 6 and FIG. 8, in the step B, the other terminals in the matched terminal list belongs to the other terminals meeting the scope limiting instruction or belongs to the other terminals searched according to the searching request.

According to the method shown in FIG. 1, a system for providing a social service based on music information in an embodiment, which is applied on a terminal side, including:

a first match selecting module configured to obtain at least one matching rule of pre-stored matching rules, and generate a match instruction, wherein the matching rules are established according to the music information;

a first sending module configured to send a match request for searching a linking object, wherein the match request includes a first query request for querying the music information stored in a server by other terminals;

a first receiving module configured to receive a reply message returned from the server according to the match request, wherein the reply message includes: a matched terminal list generated after acquiring the music information stored in the server by the other terminals and identification information corresponding to the other terminals according to the match request;

a first information acquiring module configured to match the present terminal with the music information stored in the server by the other terminals in the matched terminal list according to the match request containing the matching rule, and selecting at least one other terminal as the linking object; and a first link request sending module configured to send a link request for social interaction to the linking object according to the identification information corresponding to the linking object.

According to the above embodiment, in an embodiment, the system further includes:

a first interactive module configured to obtain at least one social interaction approach from pre-stored social interaction approaches, generate a first interaction instruction; and generate a first link request corresponding to the selected social interaction approach according to the selected social interaction approach in the interaction instruction.

According to the above embodiment, in an embodiment, the system further includes:

a location searching module configured to search the other terminal within the same location area as the present terminal; and determine a scope of the other terminal according to a search result, generate a scope limiting instruction, and add the scope limiting instruction to the match request to limit a query scope of the other terminal.

Each above function module mainly executes each step shown in FIG. 1 and FIG. 2, concrete implementations can refer to the relative explanation of the above steps, and there is no need to repeat here.

According to the method shown in FIG. 3, a system for providing a social service based on music information in an embodiment, which is applied on a terminal side, including:

a second match selecting module configured to obtain at least one matching rule of pre-stored matching rules, and generate a match instruction, wherein the matching rules are established according to the music information;

a second sending module configured to send a match request for searching a linking object, wherein the match request includes: a second query request for obtaining the linking object and the match instruction containing the matching rule, the linking object is at least one other terminal selected by a server by matching the present terminal with the music information stored in the server by other terminals according to the matching rule contained in the match instruction;

a second receiving module configured to receive a reply message returned from the server according to the match request, wherein the reply message includes: an identification list containing identification information corresponding to the other terminal, the other terminal in the identification list is at least one other terminal selected by the server according to the matching rule contained in the match instruction; and a second link request sending module configured to obtain the identification information corresponding to the linking object according to the identification list, and send a link request for social interaction to the linking object.

According to the above embodiment, in an embodiment, the system further includes:

a second interactive module for obtaining at least one social interaction approach from pre-stored social interaction approaches, and generating a second interaction instruction; and generating a second link request corresponding to the selected social interaction approach according to the selected social interaction approach in the second interaction instruction.

According to the above embodiment, in an embodiment, the system further includes:

a second location searching module for searching the other terminal within the same location area as the present terminal; and determining a scope of the other terminal according to a search result, generating a scope limiting instruction, and adding the scope limiting instruction to the match request to limit a query scope of the other terminal.

Concrete implementation of each function module refers to the relative explanation shown in FIG. 3 and FIG. 4, and there is no need to repeat here.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals such as carrier waves, infrared signals, digital signals, etc.).

According to all of the embodiments, the disclosure implements the social interaction according to the music information of the both sides of users, a social networking platform is provided via whether the favorite music and music type is the same between the both side. It can be an independent APP, and can be embedded in system of earphone or mobile phone, music APP, etc. The method, system and terminal device of the disclosure can provide more selection of matching and social interaction for the terminal users, and increase the operability, make the disclosure more humanized, improve adaptation. In the disclosure, users can enjoy the music and communicate with users having the same music hobby at the same time by running on the terminals. Various social services according to the shared music information is provided. Comparing to the prior art, users can independently select matching rule to determine the corresponding linking object, the disclosure provides more ways of selecting independently, and it is more humanized.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A method for providing a social service based on music information, comprising:
   at a present terminal:
      obtaining at least one matching rule of pre-stored matching rules, and generating a match instruction, wherein the matching rules are established according to the music information;
      sending a match request for searching a linking object, wherein the match request includes a first query request for querying the music information stored in a server by other terminals;
      receiving a reply message returned from a server according to the match request, wherein the reply message includes a matched terminal list generated by acquiring the music information stored in the server by the other terminals and identification information corresponding to the other terminals;
      matching the present terminal with the music information stored in the server by the other terminals in the matched terminal list according to the match request containing the matching rule, and selecting at least one other terminal as the linking object;
      sending a link request for social interaction to the linking object according to identification information corresponding to the linking object; and
      establishing, in response to approval of the link request from the linking object, social interaction between the present terminal and the remote terminal;
   at the server:
      receiving the match request sent from the present terminal;
      acquiring the music information stored in the server by the other terminals and the identification information corresponding to the other terminals according to the match request, and generating the matched terminal list;
      adding the matched terminal list to the reply message; and
      sending the reply message to the present terminal.

2. The method for providing a social service based on music information according to claim 1, the establishing social interaction further comprising:
   obtaining at least one social interaction approach from pre-stored social interaction approaches, and generating an interaction instruction; and
   generating a link request corresponding to the obtained at least one social interaction approach according to the selected social interaction approach in the interaction instruction.

3. The method for providing a social service based on music information according to claim 1, further comprising:
   searching the other terminals within the same location area as the present terminal; and
   determining a scope of the other terminals according to a search result, generating a scope limiting instruction, and adding the scope limiting instruction to the match request to limit a query scope of the other terminal.

4. The method for providing a social service based on music information according to claim 1, further comprising:
   searching the other terminals within the same location area as the present terminal; and
   determining a scope of the other terminals according to a search result, generating a scope limiting instruction, and adding the scope limiting instruction to the match request to limit a query scope of the other terminal.

5. A system, comprising:
   a server;
   a plurality of distinct terminals, each individual terminal comprising a processor and a non-transitory computer readable medium containing instructions which when executed by the processor cause the individual terminal to perform operations comprising:
      obtaining at least one matching rule of pre-stored matching rules, and generating a match instruction, wherein the matching rules are established according to music information;
      sending a match request for searching a linking object, wherein the match request includes a first query request for querying the music information stored in a server by other terminals;

receiving a reply message returned from the server according to the match request, wherein the reply message includes a matched terminal list generated by acquiring the music information stored in the server by the other terminals and identification information corresponding to the other terminals;

matching the individual terminal with the music information stored in the server by the other terminals in the matched terminal list according to the match request containing the matching rule, and selecting at least one other terminal as the linking object;

sending a link request for social interaction to the linking object according to identification information corresponding to the linking object; and establishing, in response to approval of the link request from the linking object, social interaction between the present terminal and the remote terminal;

the server being programmed to perform operations comprising:

receiving the match request sent from the present terminal;

acquiring the music information stored in the server by the other terminals and the identification information corresponding to the other terminals according to the match request, and generating the matched terminal list; and adding, by the server, the matched terminal list to the reply message; and sending the reply message to the present terminal.

6. The system of claim 5, the establishing social interaction further comprising:

obtaining at least one social interaction approach from pre-stored social interaction approaches, and generating an interaction instruction; and generating a link request corresponding to the selected social interaction approach according to the selected social interaction approach in the interaction instruction.

* * * * *